US005753995A

United States Patent [19]

Ogino

[11] Patent Number: 5,753,995

[45] Date of Patent: May 19, 1998

[54] DEVICE FOR INDICATING WEAR ON A MOTOR BRUSH

[75] Inventor: Kazutoshi Ogino, Anjo, Japan

[73] Assignee: Makita Corporation, Anjo, Japan

[21] Appl. No.: 753,669

[22] Filed: Nov. 27, 1996

[30] Foreign Application Priority Data

Dec. 27, 1995 [JP] Japan .................................... 7-341666

[51] Int. Cl.[6] .......................... H01R 39/38; H02K 13/00

[52] U.S. Cl. .......................... 310/242; 310/238; 310/239; 310/245; 310/246; 310/247

[58] Field of Search .................................... 310/238, 239, 310/245, 246, 247, 242; 244/134 D; 247/134 D

[56] References Cited

U.S. PATENT DOCUMENTS

| | | | |
|---|---|---|---|
| 2,813,208 | 11/1957 | Ritter | 310/247 |
| 3,609,429 | 9/1971 | Thompson | 310/246 |
| 4,172,988 | 10/1979 | Lowther | 310/245 |
| 4,272,695 | 6/1981 | Buchwald et al. | 310/242 |
| 4,344,009 | 8/1982 | Reynolds | 310/242 |
| 4,348,608 | 9/1982 | Michael | 310/242 |
| 4,488,078 | 12/1984 | Orton | 310/242 |
| 4,723,084 | 2/1988 | Reynolds | 310/247 |
| 4,739,208 | 4/1988 | Kimberlin | 310/242 |
| 4,743,787 | 5/1988 | Bunner et al. | 310/247 |
| 4,831,302 | 5/1989 | Dietrich et al. | 310/242 |
| 4,918,348 | 4/1990 | Fitzsimmons et al. | 310/242 |
| 4,950,933 | 8/1990 | Pipkin et al. | 310/239 |
| 4,977,345 | 12/1990 | Toperzer | 310/242 |

FOREIGN PATENT DOCUMENTS

| | | | |
|---|---|---|---|
| 31 33 261 | 6/1982 | Germany . | |
| 83 18 297 | 6/1983 | Germany | 247/310 |
| 35 04 881 | 8/1986 | Germany | 247/310 |
| 89 07 240 | 6/1989 | Germany | 247/310 |
| 36-6617 | 4/1961 | Japan . | |
| 39-38148 | 12/1964 | Japan . | |
| 44-25046 | 10/1969 | Japan . | |
| 45-6022 | 3/1970 | Japan . | |

*Primary Examiner*—Steven L. Stephan
*Assistant Examiner*—Elvin G. Enad
*Attorney, Agent, or Firm*—Davis and Bujold

[57] ABSTRACT

To inform a user of wear on a carbon brush for a motor earlier than when the carbon brush is actually required to be replaced with a new brush. In a motor brush wear indicating device, a metal terminal is attached to a brush holder, being opposed to the inside of a holder shank of the brush holder, and an indicator is operated when the metal terminal contacts a brush spring. The metal terminal has a contact in the middle of a length of the brush holder. The indicator can be operated while the carbon brush is continuously pressed against a commutator by the brush spring. The metal terminal serves as a leaf spring. When the carbon brush is worn and shortened, the indicator is operated. Even after the indicator operates, the carbon brush is still pressed against the commutator by the brush spring. Therefore, the user can operate a motor-driven tool for some time before the carbon brush must be replaced with a new one.

7 Claims, 3 Drawing Sheets

DEVICE FOR INDICATING WEAR ON A MOTOR BRUSH

FIELD OF THE INVENTION

This invention relates to a device for indicating that a motor brush is worn and must be replaced with a new one.

BACKGROUND OF THE INVENTION

The device for indicating wear on the motor brush is known from, for example, examined Japanese Utility Model publication No. 44-25046. As shown in FIG. 3A, a metal terminal 103 is attached to an end of a motor brush holder 101, facing the inside of the motor brush holder 101. As seen from FIG. 3B, when a brush spring 105 comes in contact with the metal terminal 103, an annunciator 107 is driven thereby indicating that it is time to replace a carbon brush 109.

In the prior art, however, when the annunciator 107 is actuated, the brush spring 105 has contacted the metal terminal 103 and no long exerts an urging force upon the carbon brush 109. Although the carbon brush 109 requires immediate replacement with a new one, the user cannot usually replace the worn carbon brush 109 at that moment. The annunciator 107 fails to indicate carbon brush wear at a time appropriate for replacement, and thus works ineffectively.

For example, an electromotive tool becomes inoperative on the spot and a brush replacement cannot be done instantly, causing trouble with the work day. Especially, a rental electromotive tool provides insufficient service to a user and loses its reliability unless the electromotive tool can be used during the rental term without replacing a brush.

SUMMARY OF THE INVENTION

Wherefore, an object of the present invention is to indicate brush replacement at an early time.

To attain this and other objects, the present invention provides a motor brush wear indicating device provided with a metal terminal with a first surface facing the inside of a motor brush holder and a contact provided on the surface apart from an end of the brush holder in the opposite direction to a commutator, and a brush spring for contacting a contact of the metal terminal and thereby operating an indicator. The indicator can be operated while a sufficiently lengthy remainder of the carbon brush is still resiliently urged onto a commutator by the brush spring.

In the brush wear indicating device of the present invention, the indicator can be operated while the carbon brush is still continuously pressed against the commutator. Therefore, even after the indicator operates, an electromotive tool with the brush wear indicating device incorporated therein can be continuously used. Users can replace the carbon brush with a new one, at their earliest convenience, after the indicator operates. The electromotive tool is prevented from becoming inoperative suddenly.

Therefore, the user does not need to have a new carbon brush or replacement tool together with the electromotive tool. A rental electromotive tool is prevented from being unable to be used during a rental term, and a rental agent is prevented from losing their reputation with customers.

In the brush wear indicating device according to the invention, especially when the metal terminal is sufficiently resilient, after contacting the expanded brush spring, the metal terminal can be pushed or deformed toward the outside of the brush holder by the brush spring, and the brush spring can be easily expanded further as the brush becomes further worn. Therefore, as aforementioned, even after the time to replace the brush is indicated, the electromotive tool can be used for some time before the brush must be replaced with a new one.

In the brush wear indicating device according to the present invention, the brush holder is inserted to an insertion part provided in the motor housing, the metal terminal is attached such that a second surface of the metal terminal faces the outside of the brush holder, a metal connector is attached to the insertion part of the motor housing for contacting the second surface of the metal terminal, and a lead wire is connected between the metal connector and the indicator.

In this structure, just by inserting the brush holder into the insertion part of the motor housing, an operating circuit for the indicator can be completed. The brush holder can be easily assembled into the motor housing. Further the brush can be easily replaced with a new one, while the brush holder is disengaged from the motor mousing.

The outer face of the brush holder has a flattened part for receiving the metal terminal, and the corresponding flattened part is disposed in the inner face of the insertion part of the motor housing for receiving the metal connector. When the flattened parts are aligned with one another, just by inserting the brush holder into the insertion part of the motor housing, the metal terminal can be connected to the metal connector. The brush holder can thus be easily assembled into the motor housing.

BRIEF DESCRIPTION OF THE DRAWINGS

The invention will now be described with reference to the drawings, in which.

DETAILED DESCRIPTION OF THE PREFERRED EMBODIMENTS

Figure 1B:
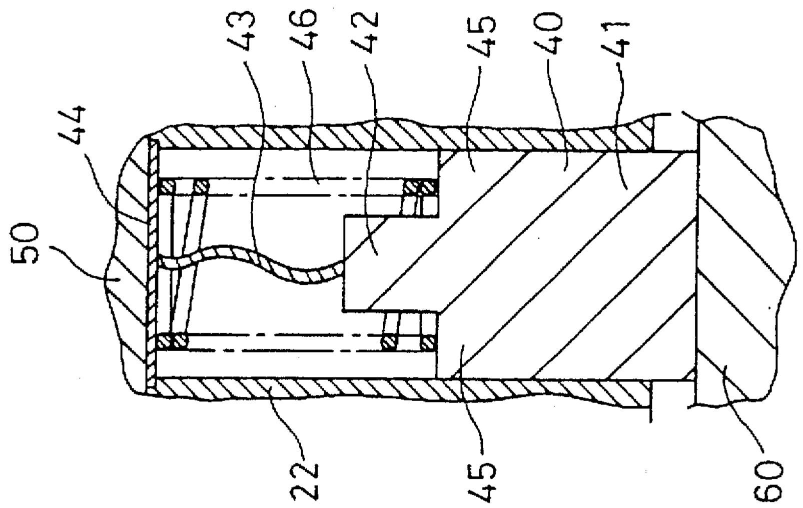
FIG. 1B is a cross-sectional view taken along section line 1B—1B in FIG. 1A.
Figure 1A:
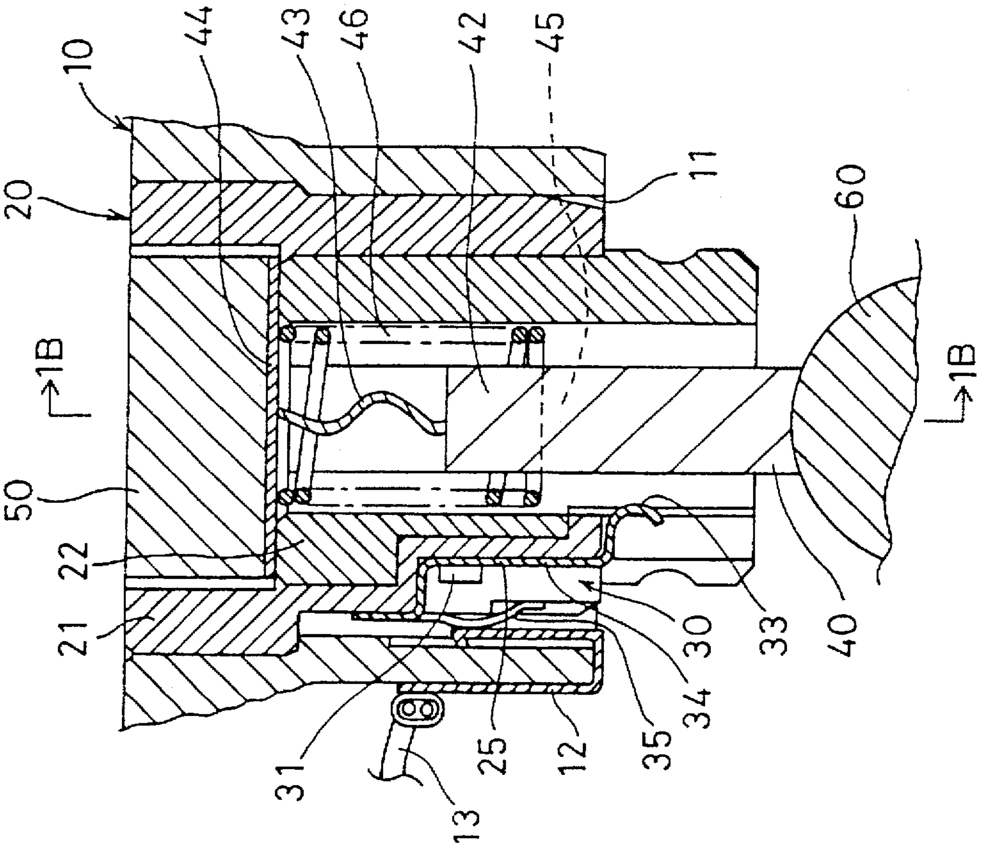
FIG. 1A is a cross-sectional view showing an assembled motor brush holder embodying the present invention.

As shown in FIG. 1A, a brush holder 20 provided with a metal terminal 30 is inserted into an engagement hole 11 of a motor housing 10. A carbon brush 40 is assembled into one end of a brush holder 20 and a holder cap 50 is screwed or fastened to the other end of the brush holder 20.

The motor housing 10, formed of a synthetic resin, has a metal connector 12 partly engaged in the engagement hole 11. The metal connector 12 is connected, via a lead wire 13, to an indicator, not shown. The face defining the engagement hole 11 of the motor housing 10 is partly flattened for receiving the metal connector 12.

Figure 2A:
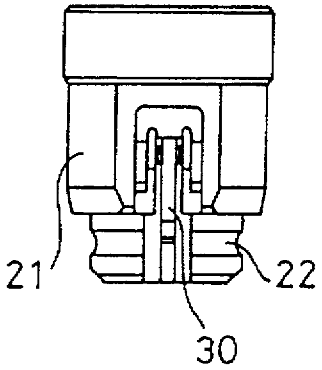
FIG. 2A is a front view of a brush holder according to the embodiment.
Figure 2B:
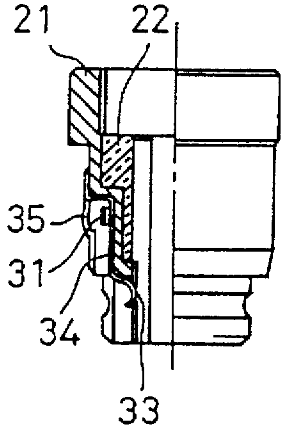
FIG. 2B is a partly broken right side view of the brush holder.
Figure 2C:
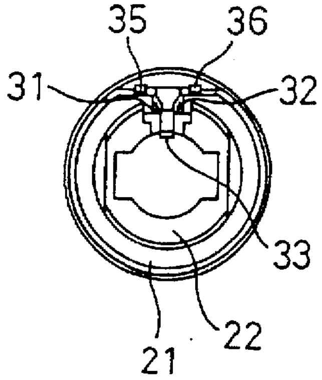
FIG. 2C is a bottom plan view of the brush holder.
Figure 2D:
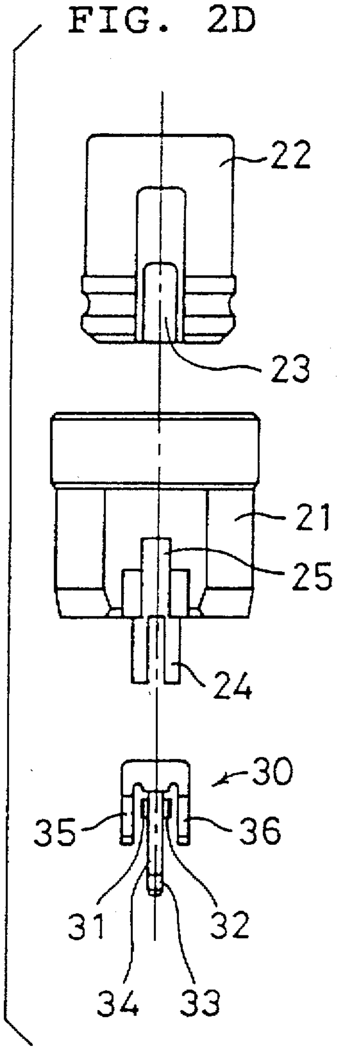
FIG. 2D is a disassembled view of FIG. 2A.
Figure 2E:
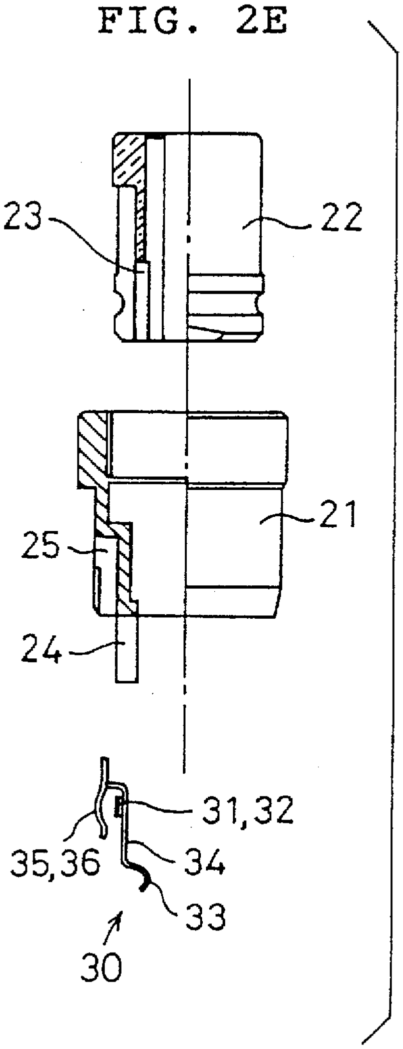
FIG. 2E is a disassembled view of FIG. 2B.
Figure 3A:
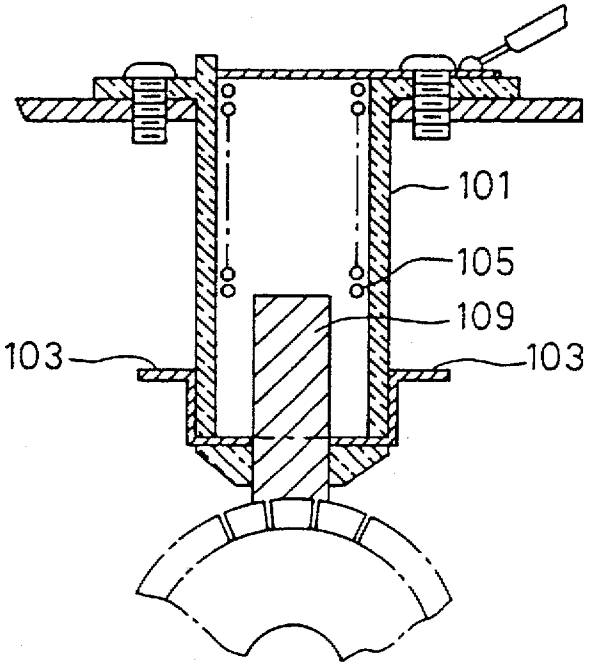
FIG. 3A PRIOR ART
FIG. 3A is a cross sectional view of a prior art assembled motor brush holder.
Figure 3B:
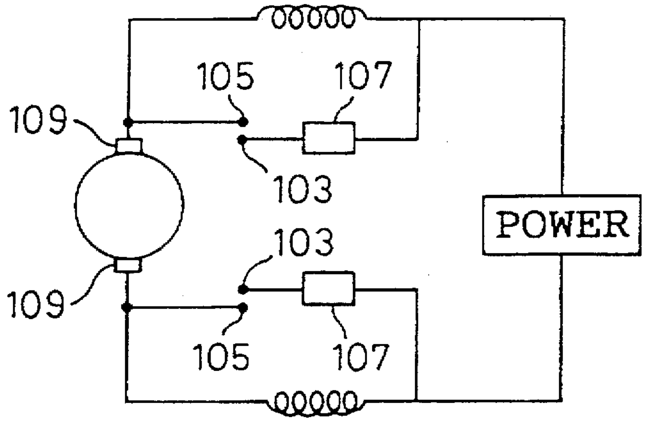
FIG. 3B PRIOR ART
FIG. 3B is a circuit diagram of a prior art brush wear indicating device.

As shown in FIGS. 2A–2C, the brush holder 20 is injection molded of synthetic resin from a metal mold in which a holder shank 22, of brass, is mounted such that the holder shank 22 is assembled in a cylindrical body 21 of synthetic resin. As shown in FIGS. 2D and 2E, a slit 23 extends from the bottom of the holder shank 22 upward along about a third of the entire length of the holder shank 22, while a guide member 24 projects downward from the bottom of the cylindrical body 21 corresponding to the slit 23. An indentation or dent 25 is formed in the root of the guide member 24 for engaging with the metal terminal 30. The outer face of the cylindrical body 21 is partly flattened for firmly engaging with the metal terminal 30. The flattened part of the cylindrical body 21 can be opposite to and parallel with the aforementioned flattened part of the motor housing 10.

As shown in FIGS. 2D and 2E, the metal terminal 30 is formed into a complicated configuration by forming or press working a copper plate. By engaging fins 31 and 32 into the dent 25, the metal terminal 30 is secured in the dent 25, and the guide member 24 facilitates the alignment thereof. A contact 33 is provided at a tip of a lever 34, which extends from the fins 31 and 32, to form a tip of a leaf spring fixed on the fins 31 and 32, and is assembled such that the contact 33 faces the inside of the holder shank 22. The metal terminal 30 contacts, via contacts 35 and 36, the metal connector 12 assembled into the motor housing 10.

As shown in FIG. 1B, the carbon brush 40 is connected to a metal support 44 via a pig tail 43 firmly attached to a projection 42 at the top of a body 41 of the carbon brush 40. The carbon brush 40 is urged apart from the metal support 44 by a brush spring 46 extending between a shoulder 45 and the metal support 44. The carbon brush 40 is connected to a power source, not shown, via the pig tail 43 and the metal support 44, and the brush spring 46 is also connected to the power source via the metal support 44.

In the brush wear indicating device having the aforementioned structure, as the carbon brush 40 is worn and shortened, the brush spring 46 is accordingly expanded. When the brush spring 46 is expanded to reach the contact 33 of the metal terminal 30, a wear indicator circuit is closed or completed, thereby actuating the indicator. For example, a lamp is lit or a buzzer is rung allowing a user to know that the carbon brush 40 is sufficiently worn and shortened and should be replaced.

Even when the user is informed of wear on the carbon brush 40, a sufficiently lengthy remainder of the carbon brush 40 can be still pressed onto a motor commutator 60 by the brush spring 46. After the carbon brush 40 is further worn, the brush spring 46 is further expanded, thereby deforming the contact 33 outwardly. Therefore, the brush spring 46 can stretch further beyond the contact 33. As a result, an electromotive tool can be operated for a sufficiently continuous period, until the brush spring 46 is completely expanded and does not apply any more pressure to the carbon brush 40. Especially, a rental electromotive tool, with the brush wear indicating device of the embodiment incorporated therein, can be used at least during a rental period.

The brush wear indicating device of the embodiment can be easily assembled by mounting the brush holder 20 from the outside into the motor housing 10 such that the metal terminal 30 can automatically contact the metal connector 12. Also, the carbon brush 40 can be easily replaced with a new brush.

This invention has been described above with reference to the preferred embodiment as shown in the figures. Modifications and alterations may become apparent to one skilled in the art upon reading and understanding the specification. Despite the use of one embodiment for illustration purposes, the invention is intended to include all such modifications and alterations within the spirit and scope of the appended claims.

What is claimed is:

1. An electrical apparatus comprising:

a housing, for housing a motor, having an engagement hole;

a brush for a motor;

a brush holder having a hole and accommodating said brush therein, said brush holder being engaged within said engagement hole of said housing, said brush holder including a cylindrical hollow body, said cylindrical body having a cap end, a hollow holder shank being attached to the inside of said cylindrical body, and a cap defining said hole in cooperation with said holder shank and being engaged in the cap end of said cylindrical body, said brush being inserted via the cap end of said cylindrical body into said hole by disengaging said cap from said brush holder;

a helical brush compression spring being provided in said holder shank and resiliently urging said brush against a commutator, said brush compression spring expanding along an expansion path within said holder shank as said brush wears;

a terminal being attached to the outside of said cylindrical body and having a contact extending along the expansion path where said brush compression spring expands; and an indicator being coupled to said terminal and said indicator being actuated when said brush compression spring contacts said contact of said terminal as said brush compression spring expands along the path;

wherein upon initial installation of said brush compression spring in said holder shank, said brush compression spring is in a compressed state and disengaged from said contact and, once said brush compression spring sufficiently expands, due to wear of said brush, said brush compression spring directly engages with said contact so that, even once said indicator is actuated by engagement between said contact and said brush compression spring, said brush compression spring continues to urge said brush against said commutator, thereby allowing the operation of said motor to be continued even once said indicator is actuated.

2. An electrical apparatus comprising:

a housing, for housing a motor, having an engagement hole;

a brush for a motor;

a brush holder having a hole accommodating said brush therein, said brush holder being engaged within said engagement hole of said housing, said brush holder including a cylindrical hollow body having a cap end, a hollow holder shank being attached to the inside of said cylindrical body, and a cap defining said hole in cooperation with said holder shank and engaged in the cap end of said cylindrical body, said brush being inserted via the cap end of said cylindrical body into said hole by disengaging said cap from said brush holder;

a helical brush compression spring being provided in said holder shank and resiliently urging said brush against a commutator, and said brush compression spring expanding along an expansion path within said holder shank as said brush wears;

a terminal being attached to an outside of said cylindrical body and having a contact extending into the expansion path of said brush compression spring;

an indicator being coupled to said terminal, and said indicator being actuated when said brush compression spring sufficiently expands along the expansion path and contacts said contact of said terminal;

wherein even after said indicator is actuated by engagement between said contact and said brush compression spring, said brush compression spring continues to urge said brush against said commutator thereby allowing the operation of said motor to be continued even once said indicator is actuated;

said brush holder has an indentation in an area of said engagement hole of said housing; and said terminal includes a lever which has a lower end and an upper end, said lever has said contact in said lower end of said lever and is bent at said upper end of said lever, a contact member coupled to the upper end of said lever and extending from said lever in a parallel direction to said lever, with pre-determined intervals, and two fins extending in opposite directions to each other and allowing said terminal to be engaged with said indentation.

3. An electrical apparatus according to claim 2, wherein said brush holder has a lower end and a guide member in the lower end of said brush holder for guiding said terminal when said terminal is inserted in said indentation.

4. An electrical apparatus according to claim 3, wherein said indentation is formed in a root portion of said guide member.

5. An electrical apparatus according to claim 2, further comprising:

a metal connector being coupled to said indicator and being attached to an interior face of said engagement hole defining said indentation;

wherein said contact member of said terminal has a face which contacts said metal connector electrically.

6. An electrical apparatus according to claim 5, wherein said brush holder has a guide member extending downwardly from a lower end of said brush holder for guiding said lever.

7. An electrical apparatus according to claim 5, wherein said indentation is formed in a root portion of said guide member.

* * * * *